US010764603B2

(12) United States Patent
Sun et al.

(10) Patent No.: US 10,764,603 B2
(45) Date of Patent: Sep. 1, 2020

(54) RESOLUTION-ADAPTIVE VIDEO CODING

(71) Applicant: Alibaba Group Holding Limited, Grand Cayman (KY)

(72) Inventors: Yu-Chen Sun, Bellevue, WA (US); Jian Lou, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/237,073

(22) Filed: Dec. 31, 2018

(65) Prior Publication Data
US 2020/0213618 A1 Jul. 2, 2020

(51) Int. Cl.
*H04N 19/59* (2014.01)
*H04N 19/573* (2014.01)
*H04N 19/172* (2014.01)
*H04N 19/184* (2014.01)
*H04N 19/52* (2014.01)

(52) U.S. Cl.
CPC ........... *H04N 19/59* (2014.11); *H04N 19/172* (2014.11); *H04N 19/184* (2014.11); *H04N 19/52* (2014.11); *H04N 19/573* (2014.11)

(58) Field of Classification Search
CPC ...... H04N 19/59; H04N 19/52; H04N 19/573; H04N 19/172; H04N 19/184
See application file for complete search history.

(56) References Cited

U.S. PATENT DOCUMENTS

| 7,526,027 | B2 | 4/2009 | Sekiguchi et al. |
| 7,773,672 | B2 | 8/2010 | Prieto et al. |
| 8,045,616 | B2 | 10/2011 | Sekiguchi et al. |
| 8,155,181 | B2 | 4/2012 | Han et al. |
| 8,406,301 | B2 | 3/2013 | Boyce |
| 8,442,108 | B2 | 5/2013 | Song et al. |
| 8,705,609 | B2 | 4/2014 | Bae |
| 8,891,619 | B2 | 11/2014 | Leontaris et al. |
| 9,106,920 | B2 | 8/2015 | Rusert et al. |
| 2009/0180536 | A1 | 7/2009 | Shimofure |
| 2009/0207919 | A1 | 8/2009 | Yin et al. |

(Continued)

OTHER PUBLICATIONS

Chen et al, "Algorithm description for Versatile Video Coding and Test Model 2 (VTM 2)," oint Video Experts Team (JVET) of ITU-T SG 16 WP 3 and ISO/IEC JTC 1/SC 29/WG 11, Ljubljana, SI, Jul. 10-18, 2018, 21 pages.

(Continued)

*Primary Examiner* — Tat C Chio
(74) *Attorney, Agent, or Firm* — Lee & Hayes, P.C.

(57) ABSTRACT

Systems and methods are provided for implementing methods for resolution-adaptive video coding in a motion prediction coding format by obtaining a current frame of a bitstream, obtaining one or more reference pictures from a reference frame buffer, up-sampling or down-sampling the obtained one or more reference pictures that have resolutions different from a resolution of the current frame, and generating a reconstructed frame from the current frame based on the one or more reference pictures and a selected motion candidate of the current frame, thereby achieving substantial reduction of network transport costs in video coding and delivery without requiring the transport of additional data that would offset or compromise these savings.

20 Claims, 10 Drawing Sheets

(56) References Cited

U.S. PATENT DOCUMENTS

2015/0103896 A1* 4/2015 Kim .................... H04N 19/503
375/240.12
2019/0356922 A1* 11/2019 Park .................... H04N 19/105

OTHER PUBLICATIONS

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, Torino, IT Jul. 13-21, 2017, 43 pages.
Lin et al., "Motion vector coding in the HEVC standard," IEEE Journal of selected topics in Signal Processing, 2012, pp. 957-968.

* cited by examiner

500

FROM 510

VIDEO DECODER SELECTING MOTION CANDIDATE FROM DERIVED MOTION CANDIDATE LIST OR MERGING CANDIDATE LIST AND DERIVING MOTION VECTOR OF MOTION CANDIDATE AS MOTION VECTOR OF BLOCK OF RECONSTRUCTED FRAME
512

VIDEO DECODER GENERATING RECONSTRUCTED FRAME FROM CURRENT FRAME BASED ON ONE OR MORE REFERENCE PICTURES AND SELECTED MOTION CANDIDATE
514

INPUTTING RECONSTRUCTED FRAME INTO AT LEAST ONE OF IN-LOOP UP-SAMPLER OR DOWN-SAMPLER AND POST-LOOP UP-SAMPLER OR DOWN-SAMPLER
516

AT LEAST ONE OF IN-LOOP UP-SAMPLER OR DOWN-SAMPLER OR POST-LOOP UP-SAMPLER OR DOWN-SAMPLER GENERATING UP-SAMPLED OR DOWN-SAMPLED RECONSTRUCTED FRAME
518

INPUTTING AT LEAST ONE OF RECONSTRUCTED FRAME AND ONE OR MORE UP-SAMPLED OR DOWN-SAMPLED RECONSTRUCTED FRAMES INTO AT LEAST ONE OF REFERENCE FRAME BUFFER AND DISPLAY BUFFER
520

FIG. 5B

RESOLUTION-ADAPTIVE VIDEO CODING

BACKGROUND

In conventional video coding formats, such as the H.264/AVC (Advanced Video Coding) and H.265/HEVC (High Efficiency Video Coding) standards, video frames in a sequence have their size and resolution recorded at the sequence-level in a header. Thus, in order to change frame resolution, a new video sequence must be generated, starting with an intra-coded frame, which carries significantly larger bandwidth costs to transmit than inter-coded frames. Consequently, although it is desirable to adaptively transmit a down-sampled, low resolution video over a network when network bandwidth becomes low, reduced or throttled, it is difficult to realize bandwidth savings while using conventional video coding formats, because the bandwidth costs of adaptively down-sampling offset the bandwidth gains.

Research has been conducted into supporting resolution changing while transmitting inter-coded frames. In the implementation of the AV1 codec, developed by AOM, a new frame type called a switch_frame is provided, which may be transmitted having different resolution than that of previous frames. However, a switch_frame is restricted in its usage, as motion vector coding of a switch_frame cannot reference motion vectors of previous frames. Such references conventionally provide another way to reduce bandwidth costs, so the use of switch_frames still sustains greater bandwidth consumption which offsets bandwidth gains.

In the development of the next-generation video codec specification, VVC/H.266, several new motion prediction coding tools are provided to further support motion vector coding which references previous frames. New techniques are required in order to implement resolution change in a bitstream with regard to these new coding tools.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 5A and 5B illustrate an example flowchart of a video coding method implementing resolution-adaptive video coding.

DETAILED DESCRIPTION

Systems and methods discussed herein are directed to enabling adaptive resolutions in video encoding, and more specifically to implementing up-sampling and down-sampling of reconstructed frames to enable inter-frame adaptive resolution changes based on motion prediction coding tools provided for by the VVC/H.266 standard.

According to example embodiments of the present disclosure, a motion prediction coding format may refer to a data format encoding motion information and prediction units (PUs) of a frame by the inclusion of one or more references to motion information and PUs of one or more other frames. Motion information may refer to data describing motion of a block structure of a frame or a unit or subunit thereof, such as motion vectors and references to blocks of a current frame or of another frame. PUs may refer to a unit or multiple subunits corresponding to a block structure among multiple block structures of a frame, such as a coding unit (CU), wherein blocks are partitioned based on the frame data and are coded according to established video codecs. Motion information corresponding to a prediction unit may describe motion prediction as encoded by any motion vector coding tool, including, but not limited to, those described herein.

According to example embodiments of the present disclosure, motion prediction coding formats may include Temporal Motion Vector Predictor (TMVP), Sub-block Temporary Motion Vector Predictor (SbTMVP), and Bi-directional Optical Flow (BIO). Features of these motion prediction coding formats relating to example embodiments of the present disclosure shall be described herein.

A decoder of the TMVP coding format may obtain a current frame of a bitstream encoded in the TMVP coding format and derive a reconstructed frame (a "TMVP reconstructed frame"). Motion information of a block of a TMVP reconstructed frame may include a motion candidate list. A motion candidate list may be a data structure containing references to multiple motion candidates. A motion candidate may be a block structure or a subunit thereof, such as a pixel or any other suitable subdivision of a block structure of a current frame or may be a reference to a motion candidate of another frame. A motion candidate may be a spatial motion candidate or a temporal motion candidate. By applying motion vector competition (MVC), a decoder may select a motion candidate from the motion candidate list and derive a motion vector of the motion candidate as a motion vector of the block of the reconstructed frame.

Motion candidates of a same block may be interrelated by spatial relationships, such as a left-right or above-below relationship in a frame. Motion candidates which are references to a motion candidate of a block of another frame may be interrelated by a temporal relationship to a current frame, such as a temporal collocation relationship between a block of the current frame and the block of the other frame.

Figure 1:
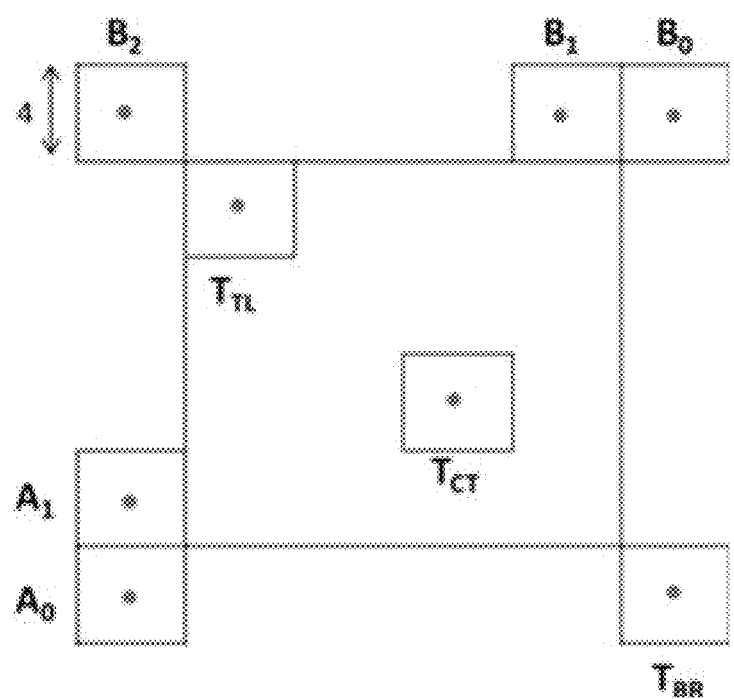
FIG. 1 illustrates an example selection of motion candidates from a block of a frame coded by TMVP.

FIG. 1 illustrates an example selection of motion candidates from a block of a frame coded by TMVP according to an example embodiment of the present disclosure.

As illustrated by FIG. 1, multiple motion candidates of a block of a frame are illustrated. Spatial motion candidates of a frame may be block subunits along a leftmost column of the block and block subunits along an uppermost row of the block. Spatial motion candidates have left-right relationships and above-below relationships corresponding to left-right and above-below orientations of FIG. 1. Temporal motion candidates of a block may be references to block subunits of a block structure of a reference picture, the reference picture being temporally collocated with the current frame and the block of the reference picture being temporally collocated with the block of the current frame.

A reference picture may be a frame referenced by a reference picture list which may reference multiple frames. A reference picture list may be one of multiple reference picture lists each referencing some frames of a reference frame buffer, wherein a reference picture list may be designated as, for example, list 0 or list 1.

A motion candidate list for motion candidates of a block of a TMVP reconstructed frame may be coded in accordance with one of several inter-coded motion prediction modes. Motion information of a block of a frame coded according to an inter-coded motion prediction mode may refer to motion information of another frame.

The motion candidate list may be coded in an inter-coded frame.

A left spatial motion candidate and an upper spatial motion candidate may be selected from spatial motion candidates of a block as follows. A left spatial motion candidate may be selected by searching from the lower-leftmost spatial motion candidate upward to the upper-leftmost spatial motion candidate and selecting the first available spatial motion candidate in accordance with MVC or likewise suitable search criteria found in relevant technology, details of which shall not be elaborated herein. For example, as illustrated by FIG. 1, an upward search may be performed from block subunit $A_0$ to block subunit $A_1$, where the first available block subunit encountered along the search is selected as a left spatial motion candidate. An upper spatial motion candidate may be selected by searching from the upper-rightmost spatial motion candidate leftward to the upper-leftmost spatial motion candidate and selecting the first available spatial motion candidate in accordance with MVC or likewise suitable search criteria found in relevant technology, details of which shall not be elaborated herein. For example, as illustrated by FIG. 1, a leftward search may be performed from block subunit $B_0$ to block subunit $B_1$, where the first available block subunit encountered along the search is selected as an upper spatial motion candidate.

According to example embodiments of the present disclosure wherein the inter-frame motion prediction mode of a TMVP reconstructed frame is an inter mode, the coding of the frame may include an inter prediction indicator. An inter prediction indicator may indicate list 0 prediction in reference to a first reference picture list referred to as list 0, list 1 prediction in reference to a second reference picture list referred to as list 1, or bi-prediction in reference to two reference picture lists referred to as, respectively, list 0 and list 1. In the cases of the inter prediction indicator indicating list 0 prediction or list 1 prediction, the coding of the frame may include a reference index referring to a reference picture of the reference frame buffer referenced by list 0 or by list 1, respectively. In the case of the inter prediction indicator indicating bi-prediction, the coding of the frame may include a first reference index referring to a first reference picture of the reference frame buffer referenced by list 0, and a second reference index referring to a second reference picture of the reference frame referenced by list 1.

The inter prediction indicator may be coded as a flag in a slice header of an inter-coded frame. The reference index or indices may be coded in a slice header of an inter-coded frame. One or two motion vector differences (MVDs) respectively corresponding to the reference index or indices may further be coded.

A temporal motion candidate may be selected from subunits of a temporally collocated block of a temporally collocated reference picture to which the inter prediction indicator and the reference index or indices refer, the temporally collocated picture being designated herein as a reference picture. A temporal motion candidate may be selected by searching among subunits of the temporally collocated block and selecting a first available temporal motion candidate in accordance with MVC or likewise suitable search criteria found in the relevant technology, details of which shall not be elaborated herein. For example, as illustrated by FIG. 1, a search may be performed among the block subunits $T_{BR}$ and $T_{CT}$ of a temporally collocated block, where $T_{BR}$ is a lower-right block relative to the block of the current frame, $T_{CT}$ is a center block relative to the block of the current frame, and the first available block subunit among $T_{BR}$ and $T_{CT}$ is selected as the temporal motion candidate.

Thus, a motion candidate list for a block of a frame coded according to an inter-coded motion prediction mode which is an inter mode may include the following motion candidates:

A left spatial motion candidate (the first block subunit available among $A_0$ and $A_1$);

An upper spatial motion candidate (the first block subunit available among $B_0$, $B_1$, and $B_2$); and A temporal motion candidate (the first block subunit available among $T_{BR}$ and $T_{CT}$).

In the case that a temporal motion candidate is selected, because motion vectors of blocks of a reference picture are not present in the frame as coded, the decoder may fetch motion vectors of the temporally collocated block of the reference picture in deriving the reconstructed frame.

According to example embodiments of the present disclosure wherein the inter-coded motion prediction mode of a TMVP reconstructed frame is a skip mode or a merge mode, the motion candidate list may be a merging candidate list. The coding of the frame may include a merge index. A merge index may refer to a motion candidate of a merging candidate list.

By the example of FIG. 1, a merging candidate list for a frame coded according to an inter-coded motion prediction mode which is a skip mode or a merge mode may include the following motion candidates:

A left spatial motion candidate ($A_1$);

An upper spatial motion candidate ($B_1$);

An upper-right spatial motion candidate ($B_0$);

A lower-left spatial motion candidate ($A_0$);

An upper-left spatial motion candidate ($B_2$); and

A temporal candidate (the first block subunit available among $T_{BR}$ and $T_{CT}$).

The coding of the current frame may include a merge index. A merge index may refer to a selected motion candidate of the merging candidate list. Based on the merge index, motion information of a PU coded in the current frame may reference an inter prediction indicator of a selected merging candidate; a reference index or indices of a selected merging candidate; and MVDs of a selected merging candidate, without an inter prediction indicator, a reference index or indices, or MVDs being coded in the current frame.

A merging candidate may be selected among the motion candidates of the merging candidate list in accordance with MVC or likewise suitable selection criteria found in the relevant technology. For example, in the case that the merging candidate is a spatial candidate, an upper-left spatial motion candidate ($B_2$ in the example illustrated by FIG. 1) is not selected unless all other spatial motion candidates are not available for selection. Details of selection criteria in general shall not be elaborated herein.

In the case that a temporal motion candidate is selected, because motion vectors of blocks of a reference picture are not present in the frame as coded, the decoder may fetch motion vectors of the temporally collocated block of the reference picture in deriving the reconstructed frame.

A sequence parameter set (SPS) flag may be coded for a TMVP reconstructed frame. The SPS flag may be set to enable an SbTMVP mode for the TMVP reconstructed frame. In cases where an SbTMVP mode is enabled for the reconstructed frame, according to example embodiments of the present disclosure, a candidate list of the frame may further include:

An SbTMVP predictor.

According to example embodiments of the present disclosure where an SbTMVP mode is enabled for the TMVP reconstructed frame, multiple subunits correspond to a block structure, such as a coding unit (CU), of a frame, such that each subunit is a sub-partition of the block. A subunit of a block structure may have an adaptively determined width and height, which may be determined based on a size indicator in a slice header of the frame where the SbTMVP mode is enabled and based on width and/or height of the block structure as follows:

A width and a height of a subunit of a block structure of a frame (in units such as, for example, pixels) may be set to a minimum value among:

A size indicator in a slice header of the frame;

A width of the block structure; and

A height of the block structure.

According to example embodiments of the present disclosure, a slice header where the SbTMVP mode is enabled may be implemented according to the VVC/H.266 standard, wherein the size indicator may be 4 pixels or 8 pixels.

According to example embodiments of the present disclosure, the size indicator (denoted as SbTMVP_size in the below example) may be set to either 4 pixels or 8 pixels based on block size statistics of a last coded picture of a same temporal layer as the present frame and based on a preset threshold. For example, a block size statistic may be an average block width and height (denoted as avg_size in the below example) among CUs coded by an SbTMVP mode of a last coded picture of the same temporal layer, wherein given the respective block sizes of each CU coded by an SbTMVP mode as $S_0, S_1, \ldots, S_{N-1}$, the average block size may be computed by the formula $$\text{avg\_size} = \sum_{i=0}^{N-1} S_i / N,$$

and the threshold may be set to, for example, 27×27 for a non-low-delay picture or to 75×75 for a low-delay picture. The size indicator may then be set as follows:

$$\text{SbTMVP\_size} = \begin{cases} 4, & \text{avg\_size} < \text{thres} \\ 8, & \text{avg\_size} \geq \text{thres} \end{cases}$$

In the case where there is no last coded picture of the same temporal layer, that is, the present frame is the first picture of a temporal layer, the size indicator may be set to 4 pixels.

According to example embodiments of the present disclosure, a spatial motion candidate or a temporal motion candidate may be selected in manners similar to the selection of spatial motion candidates and temporal motion candidates for a reconstructed frame coded by TMVP, except that, for each CU in a P or B slice, an additional rate distortion (RD) check is performed to decide whether to select the SbTMVP candidate. Furthermore, in the case that a temporal motion candidate is selected, because motion vectors of blocks of a reference picture are not present in the frame as coded, the decoder may perform the following steps with regard to the block of the current frame which is collocated with the selected temporal motion candidate of the temporally collocated reference picture:

Selecting a spatially neighboring block of the block of the current frame and deriving a motion shift from a motion vector of the selected block;

Applying the derived motion shift to the block of the current frame; and

Fetching motion vectors of the temporally collocated block of the reference picture in deriving the reconstructed frame.

Applying the derived motion shift to the block of the current frame may include adding a motion shift to coordinates of the block of the current frame.

Figure 2A:
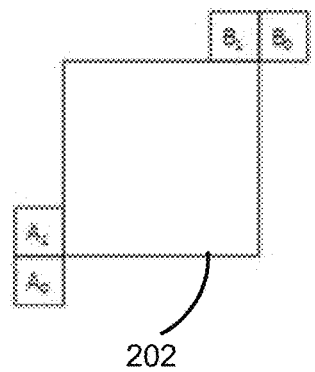
FIGS. 2A and 2B illustrate an example derivation of an SbTMVP predictor.
Figure 2B:
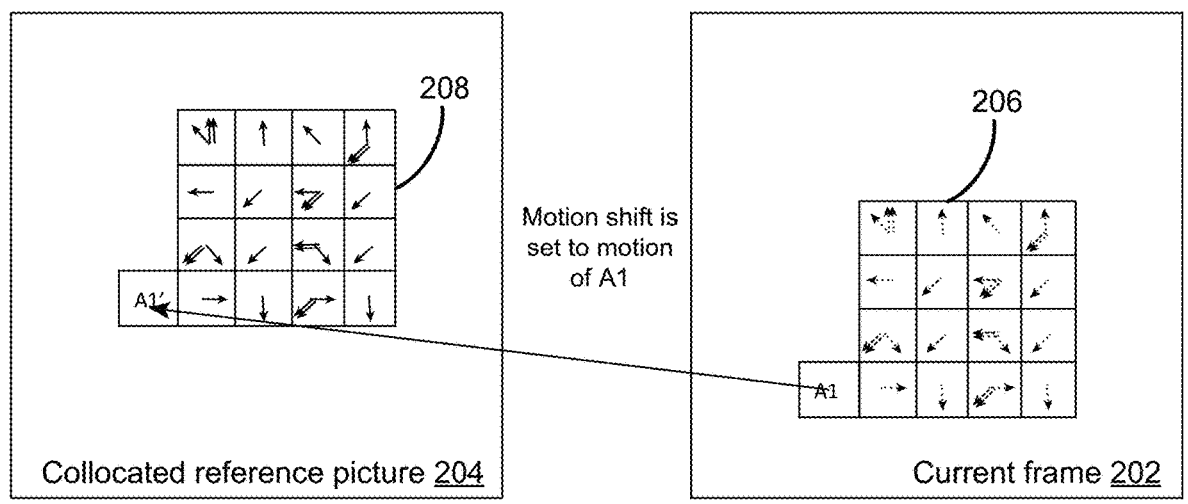

FIGS. 2A and 2B illustrate the above-referenced steps of derivation of an SbTMVP predictor according to an example embodiment of the present disclosure.

As illustrated by FIG. 2A, spatially neighboring blocks $A_0, A_1, B_0$, and $B_1$ of the block of the current frame 202 are shown. Block $A_0$ may be a block below the block of the current frame 202; block $A_1$ may be a block left of the block of the current frame 202; block $B_0$ may be a block right of the block of the current frame 202; and block $B_1$ may be a block above the block of the current frame 202. The relative positioning of each spatially neighboring block to the block of the current frame 202, or relative to each other, shall not be further limited. There shall be no limitation as to relative sizes of each spatially neighboring block to the block of the current frame 202 or to each other.

The above-mentioned spatially neighboring blocks may be searched in the order of $A_1, B_1, B_0$, and $A_0$ for a first spatially neighboring block having a motion vector referencing the temporally collocated reference picture. In the case that such a first spatially neighboring block is found, a motion shift is derived from the first spatially neighboring block. In the case that such a first spatially neighboring block is not found among the above-mentioned spatially neighboring blocks, a neutral motion shift may be set, such as a motion shift of (0, 0).

In the case where a motion shift is derived from the first spatially neighboring block, the motion shift may be added to coordinates of the current block of the frame 202, such that motion information, such as motion vectors and reference indices, of each subunit of the block is derived from a motion vector referencing the temporally collocated reference picture.

In the case where a neutral motion shift is set, coordinates of the current block of the frame 202 may remain unchanged.

As illustrated by FIG. 2B, a current frame 202 is collocated with a temporally collocated reference picture 204, and a block 206 of a current frame 202 is collocated with a selected temporal motion candidate 208 of a temporally collocated reference picture 204. The block 206 has multiple subunits. Suppose that a spatially neighboring block $A_1$ of block 206 left of block 206 is selected as a first spatially neighboring block of block 206, and thus the motion shift is derived from a spatial offset between block $A_1$ and spatially neighboring block $A_1'$ of selected temporal motion candidate 208 relative to the current frame 202 and the temporally collocated reference picture 204. Each subunit of block 208 may correspond to a subunit of the temporal motion candidate 208, and thereby motion information of the subunit of block 206 may be derived from motion information of the corresponding subunit of the temporal motion candidate 208, wherein temporal motion scaling is applied to align a motion vector of the temporal motion candidate 208 with a motion vector of the block 206.

As illustrated by FIG. 2B, single-lined arrows denote motion vectors referencing list 0, and double-lined arrows denote motion vectors referencing list 1. Broken lines indicate motion vectors after temporal motion scaling has been applied.

A decoder of the BIO coding format may obtain a current frame of a bitstream encoded in the BIO coding format and derive a reconstructed frame (a "BIO reconstructed frame"). The decoder may perform block-wise motion compensation upon the current frame based upon a reference picture of a reference frame buffer.

Next, bi-prediction may further be performed upon the current frame such that motion information of a block of the reconstructed frame may include a reference to motion information of a first reference frame and motion information of a second reference frame, the first reference frame having a first temporal distance from the current frame and the second reference frame having a second temporal distance from the current frame. The first temporal distance and the second temporal distance may be in the same temporal direction from the current frame, or may be in different temporal directions from the current frame.

Given $I^{(k)}$ as a luma value of reference k (k=0, 1) after block motion compensation, and $\partial I^{(k)}/\partial x$, $\partial I^{(k)}/\partial y$ as, respectively, horizontal and vertical components of the $I^{(k)}$ gradient, respectively. Assuming the optical flow is valid, the motion vector field $(v_x, v_y)$ is given by an equation:

$$\partial I^{(k)}/\partial t + v_x \partial I^{(k)}/\partial x + v_y \partial I^{(k)}/\partial y = 0$$

Figure 3:
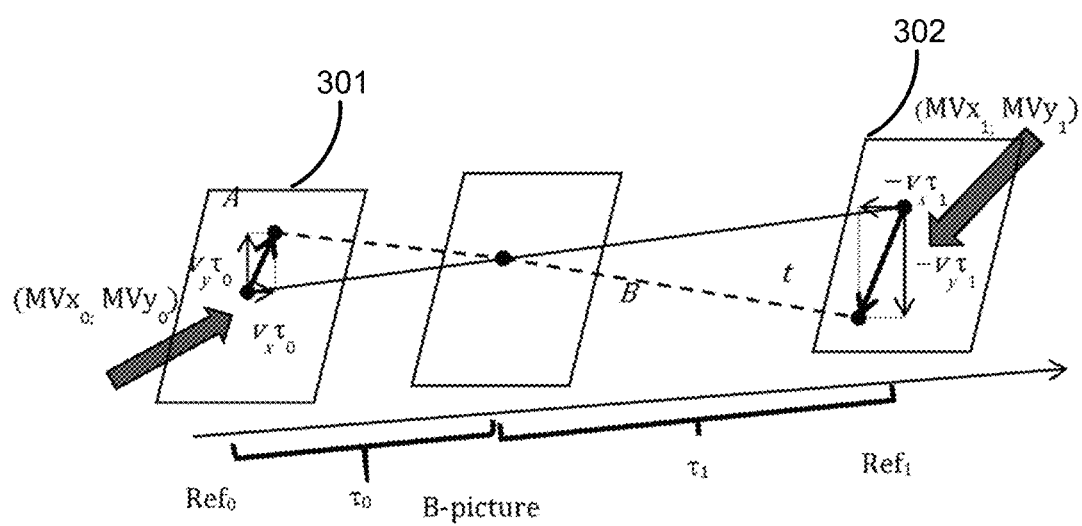
FIG. 3 illustrates an example bi-prediction utilizing a first reference frame and a second reference frame having first and second temporal distances from a current frame.

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = \frac{1}{2}$$

$$\cdot (I^{(0)} + I^{(1)} + v_x/2 \cdot (\tau_1 \partial I^{(1)}/\partial x - \tau_0 \partial I^{(0)}/\partial x) + v_y/2$$

$$\cdot (\tau_1 \partial I^{(1)}/\partial y - \tau_0 \partial I^{(0)}/\partial y))$$

Wherein $\tau_0$ and $\tau_1$ denote the first temporal distance and the second temporal distance, respectively, to the reference frames as illustrated by FIG. 3. First and second temporal distances $\tau_0$ and $\tau_1$ may be calculated based on picture order count (POC) for the first reference frame 301 ($\text{Ref}_0$) and the second reference frame 302 ($\text{Ref}_1$): $\tau_0 = \text{POC(current)} - \text{POC}(\text{Ref}_0)$, $\tau_1 = \text{POC}(\text{Ref}_1) - \text{POC(current)}$. If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), referenced regions of both reference frames have non-zero motion (i.e., $MVx_0, MVy_0, MVx_1, MVy_1 \neq 0$) and the block motion vectors are proportional to the time distance (i.e., $MVx_0/MVx_1 = MVy_0/MVy_1 = -\tau_0/\tau_1$).

The motion vector field $(v_x, v_y)$ may be determined by minimizing the difference $\Delta$ between values in points A and B (intersection of motion trajectory and reference frame planes of FIG. 3). Model uses only first linear term of a local Taylor expansion for $\Delta$:

$$\Delta = (I^{(0)} - I^{(1)}{}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y))$$

All values in the above equation depend on the sample location (i', j'), omitted from the notation thus far. Assuming the motion is consistent in the local surrounding area, $\Delta$ is minimized inside the (2M+1)×(2M+1) square window $\Omega$ centered on the currently predicted point (i, j), where M is equal to 2:

$$(v_x, v_y) = \underset{v_x, v_y}{\operatorname{argmin}} \sum_{[i',j] \in \Omega} \Delta^2[i', j']$$

Figure 4:
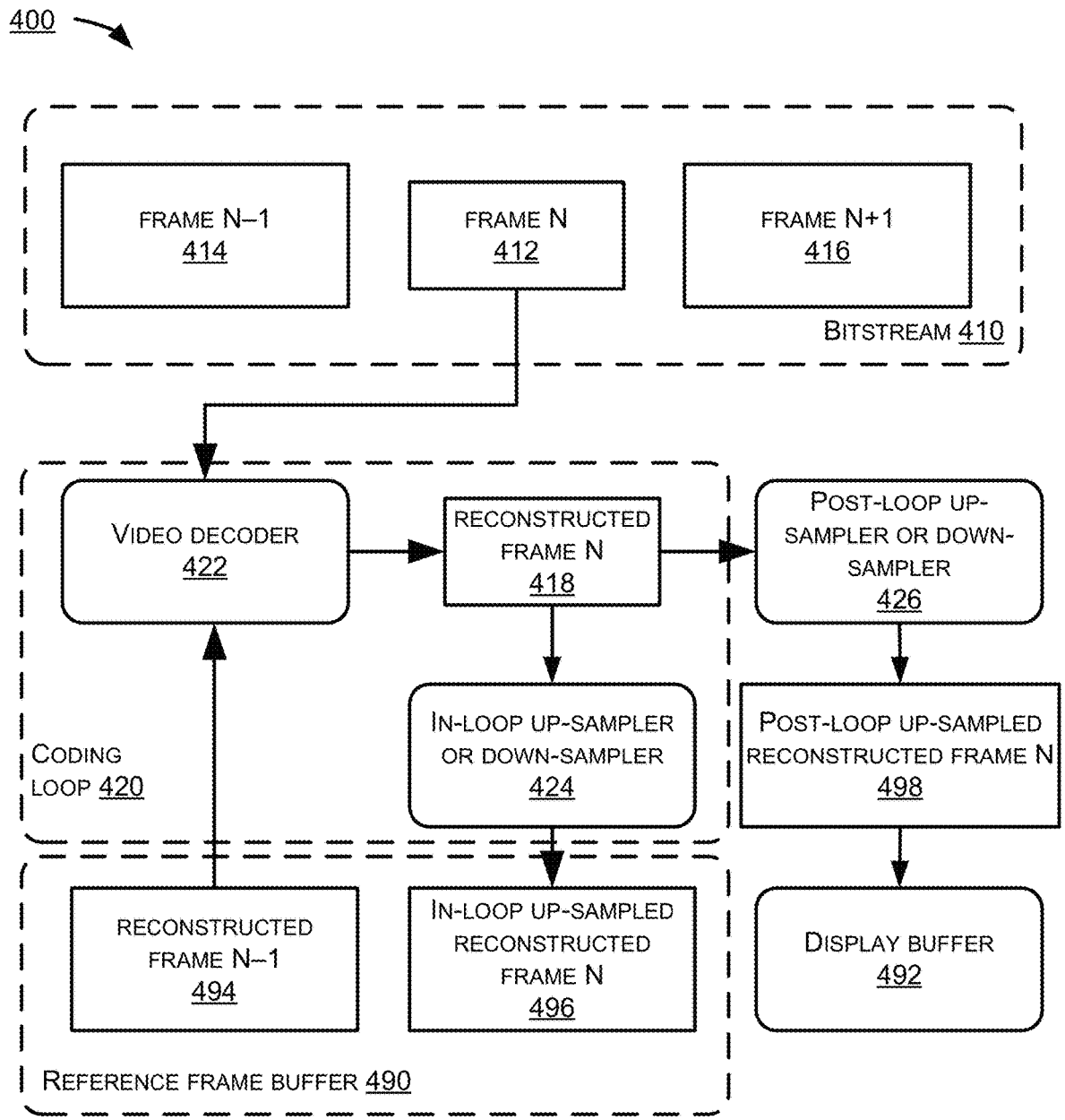
FIG. 4 illustrates an example block diagram of a video coding process.

FIG. 4 illustrates an example block diagram of a video coding process 400 according to an example embodiment of the present disclosure.

The video coding process 400 may obtain a coded frame from a source such as a bitstream 410. According to example embodiments of the present disclosure, given a current frame 412 having position N in the bitstream, a previous frame 414 having position N−1 in the bitstream may have a resolution larger than or smaller than a resolution of current frame, and a next frame 416 having position N+1 in the bitstream may have a resolution larger than or smaller than the resolution of the current frame.

The video coding system 400 may decode the current frame 412 to generate a reconstructed frame 418, and output the reconstructed frame 418 at a destination such as a reference frame buffer 490 or a display buffer 492. The current frame 412 may be input into a coding loop 420, which may include repeating the steps of inputting the current frame 412 into a video decoder 422, generating a reconstructed frame 418 based on a previous reconstructed frame 494 of the reference frame buffer 490, inputting the reconstructed frame 418 into an in-loop up-sampler or down-sampler 424, generating an up-sampled or down-sampled reconstructed frame 496, and outputting the up-sampled or down-sampled reconstructed frame 496 into the reference frame buffer 490. Alternatively, the reconstructed frame 418 may be output from the loop, which may include inputting the reconstructed frame into a post-loop up-sampler or down-sampler 426, generating an up-sampled or down-sampled reconstructed frame 498, and outputting the up-sampled or down-sampled reconstructed frame 498 into the display buffer 492.

According to example embodiments of the present disclosure, the video decoder 422 may be any decoder implementing a motion prediction coding format, including, but not limited to, those coding formats described herein. Generating a reconstructed frame based on a previous reconstructed frame of the reference frame buffer 490 may include inter-coded motion prediction as described herein, wherein the previous reconstructed frame may be an up-sampled or down-sampled reconstructed frame output by the in-loop up-sampler or down-sampler 422 during a previous coding loop, and the previous reconstructed frame serves as a reference picture in inter-coded motion prediction as described herein.

According to example embodiments of the present disclosure, an in-loop up-sampler or down-sampler 424 and a post-loop up-sampler or down-sampler 426 may each implement an up-sampling or down-sampling algorithm suitable for respectively at least up-sampling or down-sampling coded pixel information of a frame coded in a motion prediction coding format. An in-loop up-sampler or down-sampler 424 and a post-loop up-sampler or down-sampler 426 may each implement an up-sampling or down-sampling algorithm further suitable for respectively upscaling and downscaling motion information such as motion vectors.

An in-loop up-sampler or down-sampler 424 may utilize an up-sampling or down-sampling algorithm comparatively simpler and having greater computational speed compared to an algorithm utilized by a post-loop up-sampler or down-sampler 426, sufficient such that the up-sampled or down-sampled reconstructed frame 496 output by the in-loop up-sampler or down-sampler 424 may be inputted into the reference frame buffer 490 before the up-sampled or down-sampled reconstructed frame 496 is needed to serve as a previous reconstructed frame in a future iteration of the coding loop 420, whereas the up-sampled or down-sampled reconstructed frame 498 output by the post-loop up-sampler or down-sampler 426 may not be output in time before the up-sampled or down-sampled reconstructed frame 496 is thus needed. For example, an in-loop up-sampler may utilize an interpolation, average, or bilinear up-sampling algorithm not relying upon training, whereas a post-loop up-sampler may utilize a trained up-sampling algorithm.

A frame serving as a reference picture in generating a reconstructed frame 418 for the current frame 412, such as the previous reconstructed frame 494, may therefore be up-sampled or down-sampled in accordance with the resolution of the current frame 412 relative to the resolutions of the previous frame 414 and of the next frame 416. For example, the frame serving as the reference picture may be up-sampled in the case that the current frame 412 has a resolution larger than the resolutions of either or both the previous frame 414 and the next frame 416. The frame serving as the reference picture may be down-sampled in the case that the current frame 412 has a resolution smaller than either or both the previous frame 414 and the next frame 416.

Figure 5A:
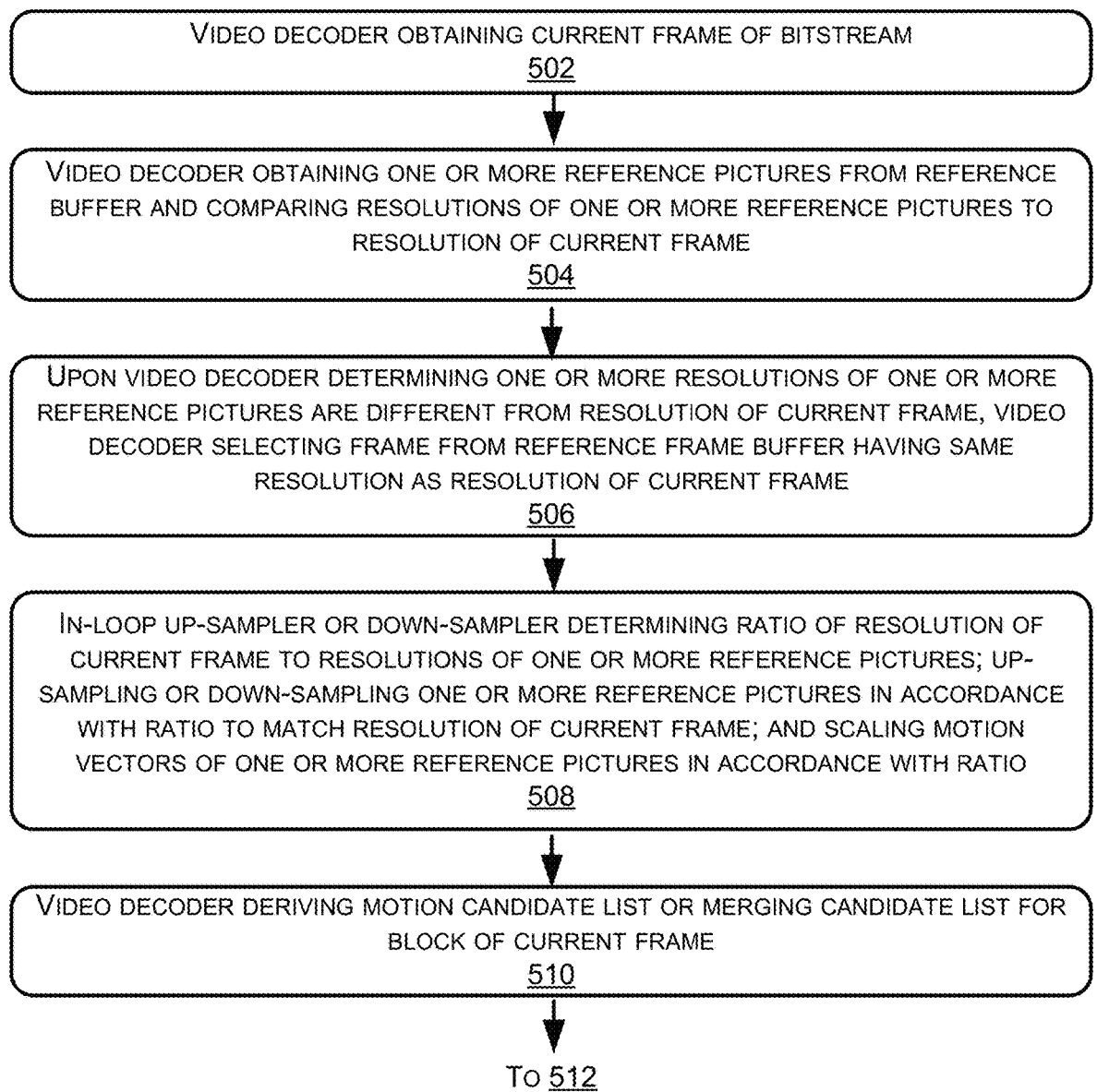

FIGS. 5A and 5B illustrate a flowchart of a video coding method 500 implementing resolution-adaptive video coding according to example embodiments of the present disclosure wherein frames are coded by TMVP or SbTMVP.

At step 502, a video decoder may obtain a current frame of a bitstream encoded in the TMVP coding format, wherein SbTMVP may further be enabled according to a header of the frame. The current frame may have a position N. A previous frame having position N−1 in the bitstream may have a resolution larger than or smaller than a resolution of the current frame, and a next frame having position N+1 in the bitstream may have a resolution larger than or smaller than the resolution of the current frame.

At step 504, the video decoder may obtain one or more reference pictures from a reference frame buffer and compare resolutions of the one or more reference pictures to a resolution of the current frame.

At step 506, upon the video decoder determining that one or more resolutions of the one or more reference pictures are different from the resolution of the current frame, the video decoder may select a frame from the reference frame buffer having a same resolution as the resolution of the current frame.

According to example embodiments of the present disclosure, the frame having a same resolution as the resolution of the current frame may be a most recent frame of the reference frame buffer having a same resolution as the resolution of the current frame, which may not be the most recent frame of the reference frame buffer.

According to example embodiments of the present disclosure, an in-loop up-sampler or down-sampler may up-sample or down-sample the one or more reference pictures in accordance with the resolution of the current frame.

At step 508, an in-loop up-sampler or down-sampler may determine a ratio of the resolution of the current frame to the resolutions of the one or more reference pictures; up-sample or down-sample the one or more reference pictures in accordance with the ratio to match the resolution of the current frame; and scale motion vectors of the one or more reference pictures in accordance with the ratio.

According to example embodiments of the present disclosure, scaling motion vectors may include increasing or decreasing magnitude of the motion vectors.

At step 510, the video decoder may derive a motion candidate list or a merging candidate list for a block of the current frame. The derivation of a motion candidate list or a merging candidate list may be performed in accordance with aforementioned steps described herein. The derivation of an SbTMVP predictor in the derivation of a motion candidate list or a merging candidate list may further be performed in accordance with aforementioned steps described herein.

According to example embodiment of the present disclosure, during the derivation of the motion candidate list or the merging candidate list, candidates which are references to candidates of another frame, where the other frame has a resolution same as the resolution of the current frame, may be inserted at the front of the motion candidate list or the merging candidate list or otherwise prioritized in position.

At step 512, the video decoder may select a motion candidate from the derived motion candidate list or merging candidate list and derive a motion vector of the motion candidate as a motion vector of the block of the reconstructed frame, in accordance with aforementioned steps described herein. The video decoder may further fetch motion vectors of a temporally collocated block of the reference picture or derive a motion shift from a temporally collocated block of the reference picture in accordance with aforementioned steps described herein.

At step 514, the video decoder may generate a reconstructed frame from the current frame based on the one or more reference pictures and the selected motion candidate.

The reconstructed frame may be predicted by reference to a selected reference picture having the same resolution as the current frame or by other frames of the reference frame buffer being up-sampled or down-sampled to the frame having a same resolution as the current frame.

At step 516, the reconstructed frame may be input into at least one of the in-loop up-sampler or down-sampler and a post-loop up-sampler or down-sampler.

At step 518, the at least one of the in-loop up-sampler or down-sampler or the post-loop up-sampler or down-sampler may generate an up-sampled or down-sampled reconstructed frame based on the reconstructed frame.

A plurality of up-sampled or down-sampled reconstructed frames may be generated each in accordance with a different resolution of a plurality of resolutions supported by the bitstream.

At step 520, at least one of the reconstructed frame and the one or more up-sampled or down-sampled reconstructed frames may be input into at least one of the reference frame buffer and a display buffer.

In the case where the reconstructed frame is input into the reference frame buffer, the reconstructed frame may be obtained as a reference picture and subsequently up-sampled or down-sampled as described with regard to step 506 above in a subsequent iteration of a coding loop. In the case where the one or more up-sampled or down-sampled reconstructed frames is input into the reference frame buffer, one of one or more up-sampled or down-sampled frames may be selected as a frame having the same resolution as a current frame in a subsequent iteration of a coding loop.

Figure 6:
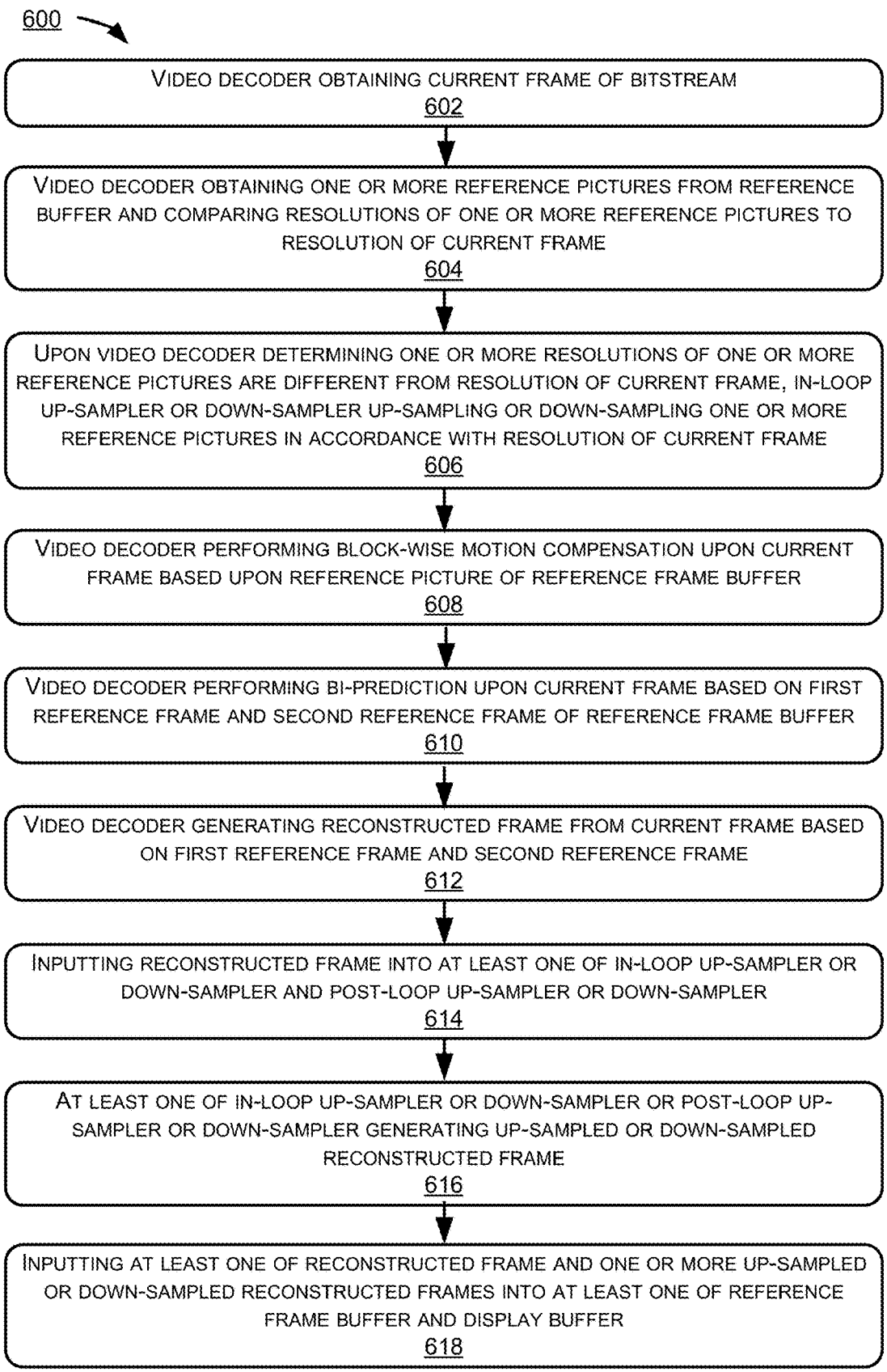
FIG. 6 illustrates another example flowchart of a video coding method implementing resolution-adaptive video coding.

FIG. 6 illustrates an example flowchart of a video coding method 600 implementing resolution-adaptive video coding according to example embodiments of the present disclosure wherein frames are coded by BIO.

At step 602, a video decoder may obtain a current frame of a bitstream encoded in the BIO coding format. The current frame may have a position N. A previous frame having position N−1 in the bitstream may have a resolution larger than or smaller than a resolution of current frame, and a next frame having position N+1 in the bitstream may have a resolution larger than or smaller than the resolution of the current frame.

At step 604, the video decoder may obtain one or more reference pictures from a reference frame buffer and compare resolutions of the one or more reference pictures to a resolution of the current frame.

At step 606, upon the video decoder determining that one or more resolutions of the one or more reference pictures are different from the resolution of the current frame, an in-loop up-sampler or down-sampler may up-sample or down-sample the one or more reference pictures in accordance with the resolution of the current frame.

According to example embodiments of the present disclosure, the video decoder may select a frame from the reference frame buffer having a same resolution as the resolution of the current frame. The frame having a same resolution as the resolution of the current frame may be a most recent frame of the reference frame buffer having a same resolution as the resolution of the current frame, which may not be the most recent frame of the reference frame buffer.

At step 608, the video decoder may perform block-wise motion compensation upon the current frame based upon a reference picture of a reference frame buffer.

At step 610, the video decoder may perform bi-prediction upon the current frame based on a first reference frame and a second reference frame of the reference frame buffer, in accordance with aforementioned steps described herein.

At step 612, the video decoder may generate a reconstructed frame from the current frame based on the first reference frame and the second reference frame.

The reconstructed frame may be predicted by reference to a selected reference picture having the same resolution as the current frame or by other frames of the reference frame buffer being up-sampled or down-sampled to the frame having a same resolution as the current frame.

At step 614, the reconstructed frame may be input into at least one of the in-loop up-sampler or down-sampler and a post-loop up-sampler or down-sampler.

At step 616, the at least one of the in-loop up-sampler or down-sampler or the post-loop up-sampler or down-sampler may generate an up-sampled or down-sampled reconstructed frame based on the reconstructed frame.

A plurality of up-sampled or down-sampled reconstructed frames may be generated each in accordance with a different resolution of a plurality of resolutions supported by the bitstream.

At step 618, at least one of the reconstructed frame and the one or more up-sampled or down-sampled reconstructed frames may be input into at least one of the reference frame buffer and a display buffer.

In the case where the reconstructed frame is input into the reference frame buffer, the reconstructed frame may be obtained as a reference picture and subsequently up-sampled or down-sampled as described with regard to step 506 above in a subsequent iteration of a coding loop. In the case where the one or more up-sampled or down-sampled reconstructed frames is input into the reference frame buffer, one of one or more up-sampled or down-sampled frames may be selected as a frame having the same resolution as a current frame in a subsequent iteration of a coding loop.

Figure 7:
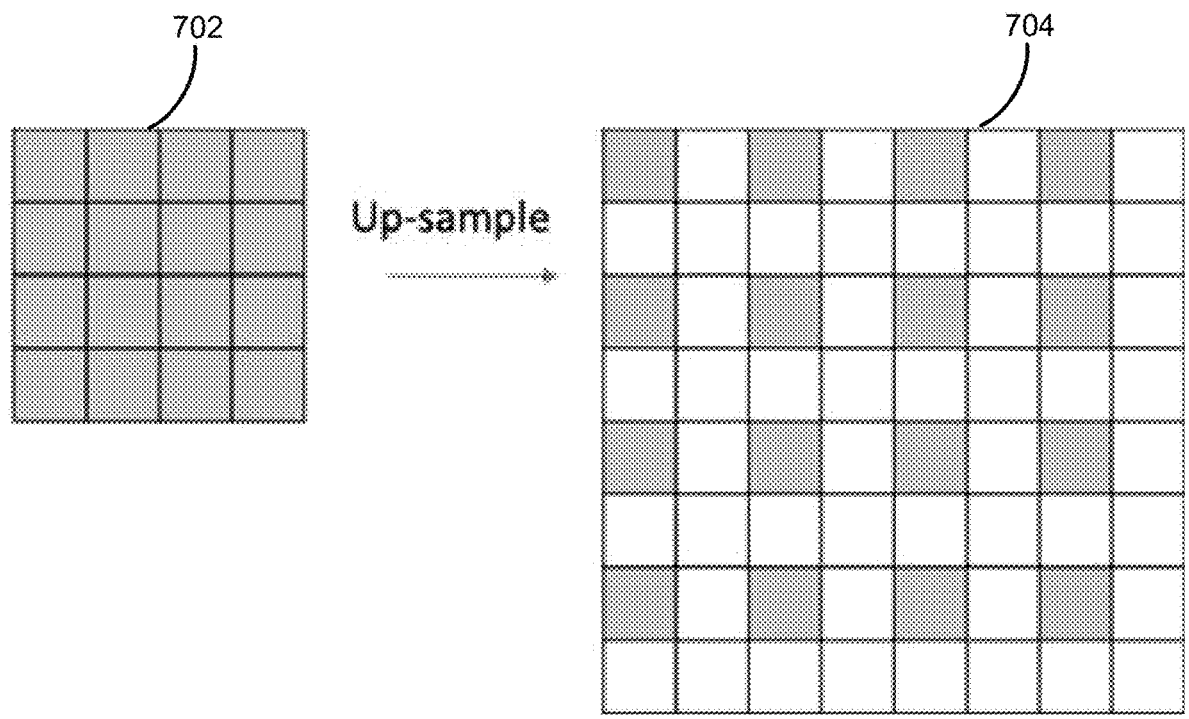
FIG. 7 illustrates an example in-loop up-sampler up-sampling a reference picture.

According to example embodiments of the present disclosure, when an in-loop up-sampler up-samples a lower-resolution reference picture to match the resolution of a higher-resolution frame, partial pixels of the up-sampled reference picture may be left the same as pixels of the low-resolution reference image. As an example, FIG. 7 illustrates an example in-loop up-sampler up-sampling a reference picture from a 4×4 pixel resolution 702 to an 8×8 pixel resolution 704. To the right side of FIG. 7, the output of the up-sampler is illustrated, wherein partial pixels of the up-sampled 8×8 reference picture may be the same as the pixels of the 4×4 reference picture, marked in grey color.

Therefore, when an up-sampled reconstructed frame is input into at least one of the reference frame buffer or the display buffer during the methods 500 or 600, the partial pixels of the up-sampled reconstructed frame which are the same as the pixels of the reference picture in the reference frame buffer may be shared between the reference picture and the up-sampled reconstructed frame. Furthermore, the in-loop up-sampler and the post-loop up-sampler may avoid applying filters to the partial pixels, to facilitate sharing the partial pixels.

Figure 8:
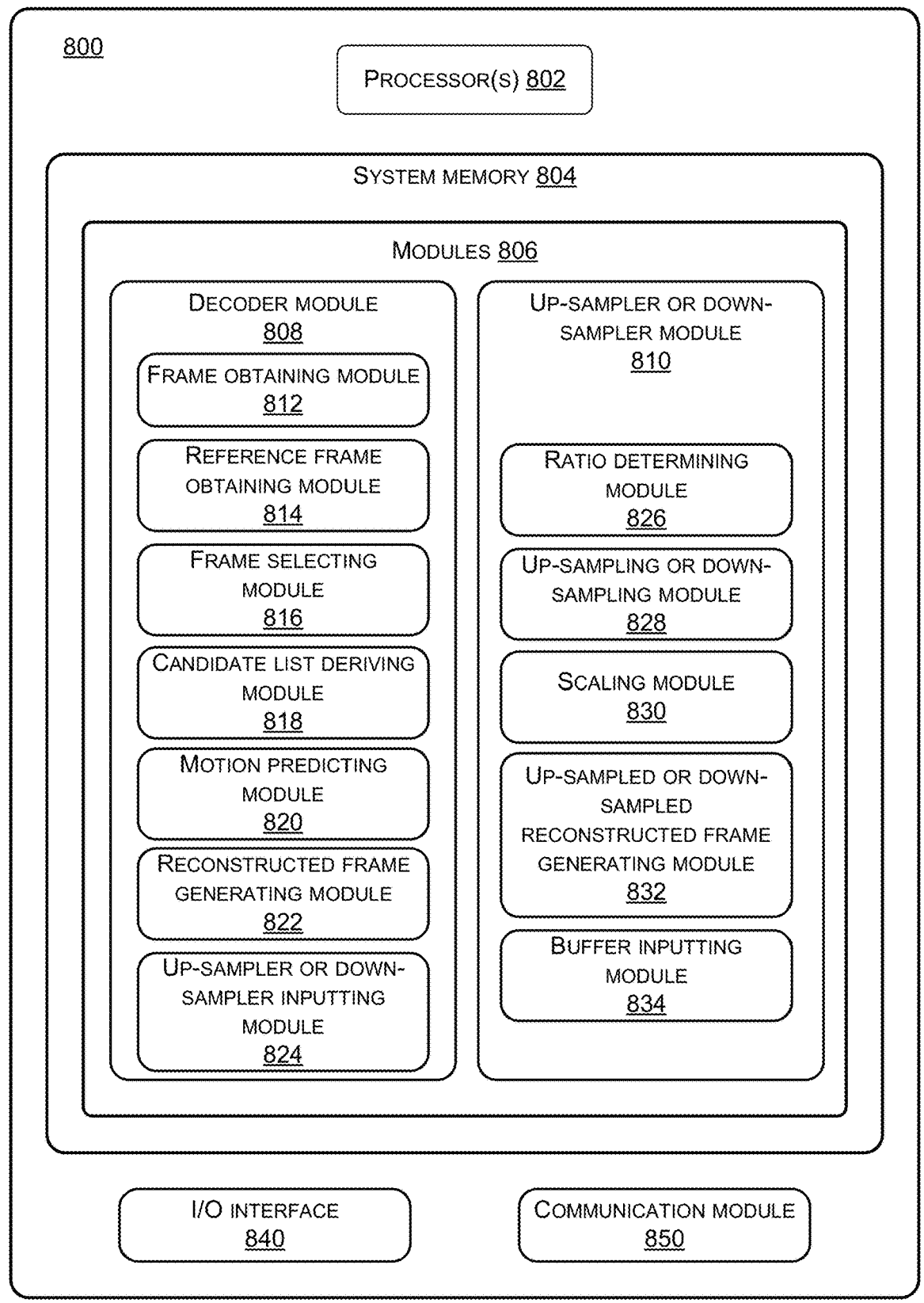
FIG. 8 illustrates an example system for implementing processes and methods for implementing resolution-adaptive video coding in a motion prediction coding format.

FIG. 8 illustrates an example system 800 for implementing the processes and methods described above for implementing resolution-adaptive video coding in a motion prediction coding format.

The techniques and mechanisms described herein may be implemented by multiple instances of the system 800 as well as by any other computing device, system, and/or environment. The system 800 shown in FIG. 8 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 800 may include one or more processors 802 and system memory 804 communicatively coupled to the processor(s) 802. The processor(s) 802 may execute one or more modules and/or processes to cause the processor(s)

802 to perform a variety of functions. In some embodiments, the processor(s) 802 may include a central processing unit (CPU), a graphics processing unit (GPU), both CPU and GPU, or other processing units or components known in the art. Additionally, each of the processor(s) 802 may possess its own local memory, which also may store program modules, program data, and/or one or more operating systems.

Depending on the exact configuration and type of the system 800, the system memory 804 may be volatile, such as RAM, non-volatile, such as ROM, flash memory, miniature hard drive, memory card, and the like, or some combination thereof. The system memory 804 may include one or more computer-executable modules (modules) 806 that are executable by the processor(s) 802.

The modules 806 may include, but are not limited to, a decoder module 808 and an up-sampler or down-sampler module 810. The decoder module 808 may include a frame obtaining module 812, a reference picture obtaining module 814, a frame selecting module 816, a candidate list deriving module 818, a motion predicting module 820, a reconstructed frame generating module 822, and an up-sampler or down-sampler inputting module 824. The up-sampler or down-sampler module 810 may include a ratio determining module 826, an up-sampling or down-sampling module 828, a scaling module 830, an up-sampled or down-sampled reconstructed frame generating module 832, and a buffer inputting module 834.

The frame obtaining module 812 may be configured to obtain a current frame of a bitstream encoded in the TMVP coding format as abovementioned with reference to FIG. 5.

The reference picture obtaining module 814 may be configured to obtain one or more reference pictures from a reference frame buffer and compare resolutions of the one or more reference pictures to a resolution of a current frame as abovementioned with reference to FIG. 5.

The frame selecting module 816 may be configured to select a frame from the reference frame buffer having a same resolution as the resolution of the current frame, upon the reference picture obtaining module 814 determining that one or more resolutions of the one or more reference pictures are different from the resolution of the current frame, as abovementioned with reference to FIG. 5.

The candidate list deriving module 818 may be configured to derive a motion candidate list or a merging candidate list for a block of the current frame, optionally derive an SbTMVP predictor according to some example embodiments of the present disclosure, and insert at the front of the list or otherwise prioritize in position candidates which are references to candidates of another frame, where the other frame has a resolution same as the resolution of the current frame, as abovementioned with reference to FIG. 5.

The motion predicting module 820 may be configured to select a motion candidate from the derived motion candidate list or merging candidate list and derive a motion vector of the motion candidate as a motion vector of the block of the reconstructed frame, and optionally, according to example embodiments of the present disclosure, fetch motion vectors of a temporally collocated block of the reference picture or derive a motion shift from a temporally collocated block of the reference picture, as abovementioned with reference to FIG. 5.

The reconstructed frame generating module 822 may be configured to generate a reconstructed frame from the current frame based on the one or more reference pictures and the selected motion candidate.

The up-sampler or down-sampler inputting module 824 may be configured to input the reconstructed frame into the up-sampler or down-sampler module 810.

The ratio determining module 826 may be configured to determine a ratio of the resolution of the current frame to the resolutions of the one or more reference pictures.

The up-sampling or down-sampling module 828 may be configured to up-sample or down-sample the one or more reference pictures in accordance with the ratio to match the resolution of the current frame.

The scaling module 830 may be configured to scale motion vectors of the one or more reference pictures in accordance with the ratio.

The up-sampled or down-sampled reconstructed frame generating module 832 may be configured to generate an up-sampled or down-sampled reconstructed frame based on the reconstructed frame.

The buffer inputting module 834 may be configured to input the up-sampled or down-sampled reconstructed frame into at least one of the reference frame buffer and a display buffer such that partial pixels which are the same between an up-sampled reconstructed frame and a reference picture in the reference frame buffer may be shared as abovementioned with reference to FIG. 5.

The system 800 may additionally include an input/output (I/O) interface 840 for receiving bitstream data to be processed, and for outputting reconstructed frames into a reference frame buffer and/or a display buffer. The system 800 may also include a communication module 850 allowing the system 800 to communicate with other devices (not shown) over a network (not shown). The network may include the Internet, wired media such as a wired network or direct-wired connections, and wireless media such as acoustic, radio frequency (RF), infrared, and other wireless media.

Figure 9:
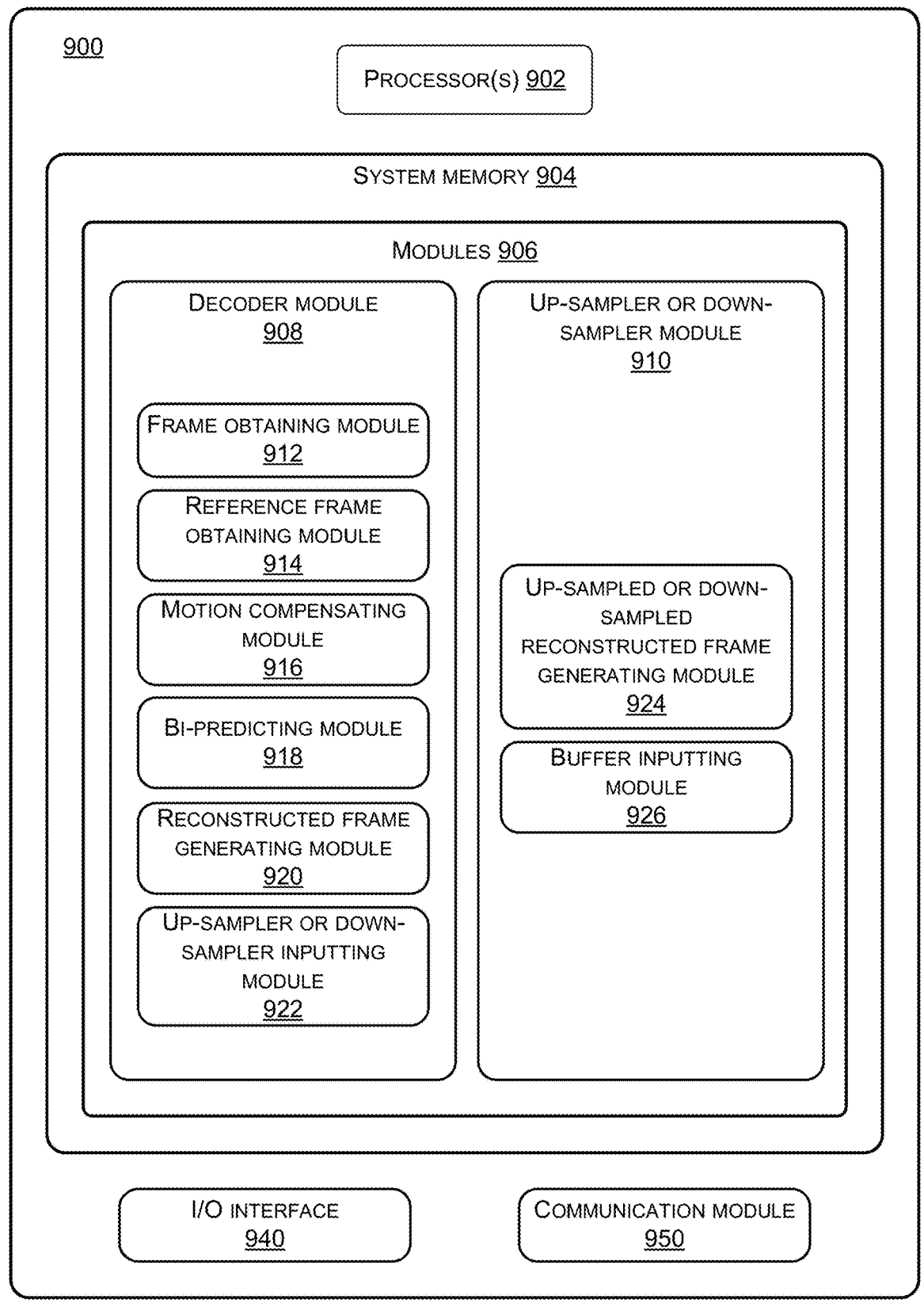
FIG. 9 illustrates an example system for implementing processes and methods for implementing resolution-adaptive video coding in a motion prediction coding format.

FIG. 9 illustrates an example system 900 for implementing the processes and methods described above for implementing resolution-adaptive video coding in a motion prediction coding format.

The techniques and mechanisms described herein may be implemented by multiple instances of the system 900 as well as by any other computing device, system, and/or environment. The system 900 shown in FIG. 9 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 900 may include one or more processors 902 and system memory 904 communicatively coupled to the processor(s) 902. The processor(s) 902 may execute one or more modules and/or processes to cause the processor(s) 902 to perform a variety of functions. In some embodiments, the processor(s) 902 may include a central processing unit (CPU), a graphics processing unit (GPU), both CPU and GPU, or other processing units or components known in the art. Additionally, each of the processor(s) 902 may possess its own local memory, which also may store program modules, program data, and/or one or more operating systems.

Depending on the exact configuration and type of the system 900, the system memory 904 may be volatile, such as RAM, non-volatile, such as ROM, flash memory, miniature hard drive, memory card, and the like, or some combination thereof. The system memory 904 may include one or more computer-executable modules (modules) 906 that are executable by the processor(s) 902.

The modules 906 may include, but are not limited to, a decoder module 908 and an up-sampler or down-sampler module 910. The decoder module 908 may include a frame obtaining module 912, a reference picture obtaining module 914, a motion compensation module 916, a bi-predicting module 918, a reconstructed frame generating module 920, and an up-sampler or down-sampler inputting module 922. The up-sampler or down-sampler module 910 may include an up-sampled or down-sampled reconstructed frame generating module 924, and a buffer inputting module 926.

The frame obtaining module 912 may be configured to obtain a current frame of a bitstream encoded in the BIO coding format as abovementioned with reference to FIG. 6.

The reference picture obtaining module 914 may be configured to obtain one or more reference pictures from a reference frame buffer and compare resolutions of the one or more reference pictures to a resolution of a current frame as abovementioned with reference to FIG. 6.

The motion compensation module 916 may be configured to perform block-wise motion compensation upon the current frame based upon a reference picture of the reference frame buffer, as abovementioned with reference to FIG. 6.

The bi-prediction module 918 may be configured to performs bi-prediction upon the current frame based on a first reference frame and a second reference frame of the reference frame buffer, as abovementioned with reference to FIG. 6.

The reconstructed frame generating module 920 may be configured to generate a reconstructed frame from the current frame based on the first reference frame and the second reference frame.

The up-sampler or down-sampler inputting module 922 may be configured to input the reconstructed frame into the up-sampler or down-sampler module 910.

The up-sampled or down-sampled reconstructed frame generating module 924 may be configured to generate an up-sampled or down-sampled reconstructed frame based on the reconstructed frame.

The buffer inputting module 926 may be configured to input the up-sampled or down-sampled reconstructed frame into at least one of the reference frame buffer and a display buffer such that partial pixels which are the same between an up-sampled reconstructed frame and a reference picture in the reference frame buffer may be shared as abovementioned with reference to FIG. 6.

The system 900 may additionally include an input/output (I/O) interface 940 for receiving bitstream data to be processed, and for outputting reconstructed frames into a reference frame buffer and/or a display buffer. The system 900 may also include a communication module 950 allowing the system 900 to communicate with other devices (not shown) over a network (not shown). The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-9. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides inter-coded resolution-adaptive video coding supported by motion prediction coding formats, improving the video coding process under multiple motion prediction coding formats by enabling resolution changes between frames to be coded while allowing motion vectors to reference previous frames. Thus, the bandwidth savings of inter-coding are maintained, the bandwidth savings of motion prediction coding are realized allowing reference frames to be used to predict motion vectors of subsequent frames, and the bandwidth savings of adaptively down-sampling and up-sampling according to bandwidth availability are also realized, all at the same time, achieving substantial improvement of network costs during video coding and content delivery while reducing the transport of additional data that would offset or compromise these savings.

Example Clauses

A. A method comprising: obtaining a current frame of a bitstream; obtaining one or more reference pictures from a reference frame buffer; up-sampling or down-sampling the obtained one or more reference pictures that have resolutions different from a resolution of the current frame; and generating a reconstructed frame from the current frame based on the one or more reference pictures and motion information of one or more blocks of the current frame, the motion information including at least one reference to motion information of another frame.

B. The method as paragraph A recites, further comprising: comparing resolutions of the one or more reference pictures to a resolution of the current frame; upon determining that one or more resolutions of the one or more reference pictures are different from the resolution of the current frame, selecting a frame from the reference frame buffer having a same resolution as the resolution of the current frame; and determining a ratio of the resolution of the current frame to the resolutions of the one or more reference pictures; up-sampling or down-sampling the one or more reference pictures in accordance with the ratio to match the resolution of the current frame; and scaling motion vectors of the one or more reference pictures in accordance with the ratio.

C. The method as paragraph A recites, further comprising: deriving a motion candidate list or a merging candidate list for the current frame; and selecting a motion candidate from the derived motion candidate list or merging candidate list and derives a motion vector of the motion candidate as a motion vector of the block of the reconstructed frame.

D. The method as paragraph C recites, further comprising: fetching motion vectors of a temporally collocated block of the reference picture or deriving a motion shift from a temporally collocated block of the reference picture.

E. The method as paragraph A recites, further comprising: generating a reconstructed frame from the current frame based on the one or more reference pictures and motion information of the current frame; inputting the reconstructed frame into at least one of the in-loop up-sampler or down-sampler and a post-loop up-sampler or down-sampler; generating an up-sampled or down-sampled reconstructed frame based on the reconstructed frame; and inputting the up-sampled or down-sampled reconstructed frame into at least one of the reference frame buffer and a display buffer.

F. A method comprising: obtaining a current frame of a bitstream; obtaining one or more reference pictures from a reference frame buffer and comparing resolutions of the one or more reference pictures to a resolution of the current frame; and upon determining that one or more resolutions of the one or more reference pictures are different from the resolution of the current frame, up-sampling or down-sampling the one or more reference pictures in accordance with the resolution of the current frame.

G. The method as paragraph F recites, further comprising performing block-wise motion compensation upon the current frame based upon a reference picture of a reference frame buffer.

H. The method as paragraph G recites, further comprising performing bi-prediction upon the current frame based on a first reference frame and a second reference frame of the reference frame buffer.

I. The method as paragraph H recites, further comprising generating a reconstructed frame from the current frame based on the first reference frame and the second reference frame; inputting the reconstructed frame into at least one of the in-loop up-sampler or down-sampler and a post-loop up-sampler or down-sampler; generating an up-sampled or down-sampled reconstructed frame based on the reconstructed frame; and inputting the up-sampled or down-sampled reconstructed frame into at least one of the reference frame buffer and a display buffer.

J. A method comprising: obtaining a current frame of a bitstream, the bitstream including frames having a plurality of resolutions; obtaining from a reference frame buffer one or more reference pictures; generating a reconstructed frame from the current frame based on the one or more reference pictures and motion information of one or more blocks of the current frame, the motion information including at least one reference to motion information of another frame; and up-sampling or down-sampling the current reconstructed frame for each resolution of the plurality of resolutions to generate an up-sampled or down-sampled reconstructed frame matching the respective resolution.

K. The method as paragraph J recites, wherein the one or more reference pictures are selected from frames of the reference frame buffer having resolutions the same as a resolution of the current frame.

L. The method as paragraph K recites, wherein the one or more reference pictures do not include a most recent frame of the reference frame buffer.

M. The method as paragraph J recites, further comprising inputting the reconstructed frame and each up-sampled or down-sampled reconstructed frame into the reference frame buffer.

N. A system comprising: one or more processors and memory communicatively coupled to the one or more processors, the memory storing computer-executable modules executable by the one or more processors that, when executed by the one or more processors, perform associated operations, the computer-executable modules including: a frame obtaining module configured to obtain a current frame of a bitstream; and a reference picture obtaining module configured to obtain one or more reference pictures from a reference frame buffer and compare resolutions of the one or more reference pictures to a resolution of a current frame.

O. The system as paragraph N recites, further comprising: a frame selecting module configured to select a frame from the reference frame buffer having a same resolution as the resolution of the current frame, upon the reference picture obtaining module determining that one or more resolutions of the one or more reference pictures are different from the resolution of the current frame.

P. The system as paragraph O recites, further comprising: a candidate list deriving module configured to derive a motion candidate list or a merging candidate list for a block of the current frame.

Q. The system as paragraph P recites, wherein the candidate list deriving module is further configured to derive a SbTMVP predictor according to some example embodiments of the present disclosure, and insert at the front of the list or otherwise prioritize in position candidates which are references to candidates of another frame, where the other frame has a resolution same as the resolution of the current frame.

R. The system as paragraph Q recites, further comprising a motion predicting module configured to select a motion candidate from the derived motion candidate list or merging candidate list and derive a motion vector of the motion candidate as a motion vector of the block of the reconstructed frame.

S. The system as paragraph R recites, wherein the motion predicting module is further configured to fetch motion vectors of a temporally collocated block of the reference picture or derive a motion shift from a temporally collocated block of the reference picture.

T. The system as paragraph N recites, further comprising: a reconstructed frame generating module configured to generate a reconstructed frame from the current frame based on the one or more reference pictures and the selected motion candidate; an up-sampler or down-sampler inputting module configured to input the reconstructed frame into the up-sampler or down-sampler module; a ratio determining module configured to determine a ratio of the resolution of the current frame to the resolutions of the one or more reference pictures; and an up-sampling or down-sampling module configured to up-sample or down-sample the one or more reference pictures in accordance with the ratio to match the resolution of the current frame; a scaling module configured to scale motion vectors of the one or more reference pictures in accordance with the ratio; an up-sampled or down-sampled reconstructed frame generating module configured to generate an up-sampled or down-sampled reconstructed frame based on the reconstructed frame; and a buffer inputting module configured to input the up-sampled or down-sampled reconstructed frame into at least one of the reference frame buffer and a display buffer such that partial pixels which are the same between an up-sampled reconstructed frame and a reference picture in the reference frame buffer may be shared.

U. A system comprising: one or more processors and memory communicatively coupled to the one or more processors, the memory storing computer-executable modules executable by the one or more processors that, when executed by the one or more processors, perform associated operations, the computer-executable modules including: a frame obtaining module configured to obtain a current frame of a bitstream; and a reference picture obtaining module configured to obtain one or more reference pictures from a reference frame buffer and compare resolutions of the one or more reference pictures to a resolution of a current frame.

V. The system as paragraph U recites, further comprising: a motion compensation module configured to perform block-wise motion compensation upon the current frame based upon a reference picture of the reference frame buffer.

W. The system as paragraph V recites, further comprising: a bi-prediction module configured to performs bi-prediction upon the current frame based on a first reference frame and a second reference frame of the reference frame buffer.

X. The system as paragraph W recites, further comprising: a reconstructed frame generating module configured to generate a reconstructed frame from the current frame based on the first reference frame and the second reference frame; an up-sampler or down-sampler inputting module configured to input the reconstructed frame into the up-sampler or down-sampler module; an up-sampled or down-sampled reconstructed frame generating module configured to generate an up-sampled or down-sampled reconstructed frame based on the reconstructed frame; and a buffer inputting module configured to input the up-sampled or down-sampled reconstructed frame into at least one of the reference frame buffer and a display buffer such that partial pixels which are the same between an up-sampled reconstructed frame and a reference picture in the reference frame buffer may be shared.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   obtaining a current frame of a bitstream;
   obtaining one or more reference pictures from a reference frame buffer;
   generating a reconstructed frame from the current frame based on the one or more reference pictures and motion information of one or more blocks of the current frame, the motion information including at least one reference to motion information of another frame;
   deriving a motion candidate list for a block of the current frame, the motion candidate list including a plurality of motion candidates; and
   prioritizing motion candidates which reference another frame having a same resolution as a resolution of the current frame.

2. The method of claim 1, further comprising:
   up-sampling or down-sampling the obtained one or more reference pictures that have resolutions different from the resolution of the current frame.

3. The method of claim 2, wherein up-sampling or down-sampling the one or more reference pictures is performed in accordance with a ratio of the resolution of the current frame and the resolution of the one or more reference pictures, to match the resolution of the current frame, and further comprising:
   inputting the reconstructed frame into the reference frame buffer as a reference picture.

4. The method of claim 3, further comprising scaling motion vectors of the one or more reference pictures in accordance with the ratio.

5. The method of claim 1, wherein deriving the motion candidate list further comprises deriving an SbTMVP predictor.

6. The method of claim 1, further comprising:
   selecting a motion candidate from the derived motion candidate list; and
   deriving motion information of the motion candidate as motion information of the block of the current frame.

7. The method of claim 6, wherein the motion candidate comprises a reference to a reference picture, and deriving motion information of the motion candidate further comprises:
   fetching motion information of a block of the reference picture temporally collocated with the block of the current frame.

8. A system comprising:
   one or more processors; and
   memory communicatively coupled to the one or more processors, the memory storing computer-executable modules executable by the one or more processors that, when executed by the one or more processors, perform associated operations, the computer-executable modules including:
   a frame obtaining module configured to obtain a current frame of a bitstream;

a reference frame obtaining module configured to obtain one or more reference pictures from a reference frame buffer;

a reconstructed frame generating module configured to generate a reconstructed frame from the current frame based on the one or more reference pictures and motion information of one or more blocks of the current frame, the motion information including at least one reference to motion information of another frame;

a candidate list deriving module configured to:
- derive a motion candidate list for a block of the current frame, the motion candidate list including a plurality of motion candidates, and
- prioritize motion candidates which reference another frame having a same resolution as a resolution of the current frame.

9. The system of claim 8, wherein the computer-executable modules further include:
an up-sampling or down-sampling module configured to up-sample or down-sample the obtained one or more reference pictures that have resolutions different from the resolution of the current frame.

10. The system of claim 9, wherein the up-sampling or down-sampling module is further configured to up-sample or down-sample the one or more reference pictures based on the resolution of the current frame in accordance with a ratio of the resolution of the current frame and the resolution of the one or more reference pictures, to match the resolution of the current frame, and
the computer-executable modules further include:
a buffer inputting module configured to input the reconstructed frame into the reference frame buffer as a reference picture.

11. The system of claim 10, wherein the computer-executable modules further include:
a scaling module configured to scale motion vectors of the one or more reference pictures in accordance with the ratio.

12. The system of claim 8, wherein the candidate list deriving module is further configured to derive an SbTMVP predictor.

13. The system of claim 8, wherein the computer-executable modules further include a motion predicting module configured to select a motion candidate from the derived motion candidate list and derive motion information of the motion candidate as motion information of the block of the reconstructed frame.

14. The system of claim 13, wherein the motion candidate comprises a reference to motion information of a reference picture, and the motion predicting module is further configured to:

fetch motion information of a block of the reference picture temporally collocated with the block of the current frame.

15. One or more computer-readable storage media storing thereon computer-executable instructions that, when executed by one or more processors, cause the one or more processors to perform operations comprising:
obtaining a current frame of a bitstream;
obtaining one or more reference pictures from a reference frame buffer;
generating a reconstructed frame from the current frame based on the one or more reference pictures and motion information of one or more blocks of the current frame, the motion information including at least one reference to motion information of another frame;
deriving a motion candidate list for a block of the current frame, the motion candidate list including a plurality of motion candidates; and
prioritizing motion candidates which reference another frame having a same resolution as a resolution of the current frame.

16. The one or more computer-readable storage media of claim 15, wherein the operations further comprise:
up-sampling or down-sampling the obtained one or more reference pictures that have resolutions different from the resolution of the current frame.

17. The one or more computer-readable storage media of claim 16, wherein up-sampling or down-sampling the one or more reference pictures is performed in accordance with a ratio of the resolution of the current frame and the resolution of the one or more reference pictures, to match the resolution of the current frame, and
the operations further comprise:
inputting the reconstructed frame into the reference frame buffer as a reference picture.

18. The one or more computer-readable storage media of claim 17, wherein the operations further comprise:
scaling motion vectors of the one or more reference pictures in accordance with the ratio.

19. The one or more computer-readable storage media of claim 15, wherein the motion candidate list further comprises deriving an SbTMVP predictor.

20. The one or more computer-readable storage media of claim 15, wherein the operations further comprise:
selecting a motion candidate from the derived motion candidate list; and
deriving motion information of the motion candidate as motion information of the block of the current frame.

* * * * *